(12) United States Patent
Leyland et al.

(10) Patent No.: US 9,827,502 B2
(45) Date of Patent: Nov. 28, 2017

(54) INTERACTIVE VIDEO GAME WITH TOYS HAVING SPECIAL EFFECTS

(75) Inventors: Robert Leyland, Novato, CA (US); I-Wei Huang, Novato, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 220 days.

(21) Appl. No.: 13/359,361

(22) Filed: Jan. 26, 2012

(65) Prior Publication Data

US 2013/0196766 A1   Aug. 1, 2013

(51) Int. Cl.

| A63F 9/24 | (2006.01) |
|---|---|
| A63F 13/00 | (2014.01) |
| G06F 17/00 | (2006.01) |
| G06F 19/00 | (2011.01) |
| A63F 13/95 | (2014.01) |
| A63F 13/28 | (2014.01) |
| A63F 13/42 | (2014.01) |

(52) U.S. Cl.
CPC ............. *A63F 13/95* (2014.09); *A63F 9/24* (2013.01); *A63F 13/28* (2014.09); *A63F 13/42* (2014.09)

(58) Field of Classification Search
CPC ..... A63F 13/23; A63F 13/26; A63F 2300/301
USPC ............... 463/38, 39; 273/237–238
See application file for complete search history.

(56) References Cited

U.S. PATENT DOCUMENTS

| 5,746,602 A * | 5/1998 | Kikinis ................ 434/169 |
|---|---|---|
| 5,853,327 A | 12/1998 | Gilboa |
| 6,575,810 B1 | 6/2003 | Sohn |
| 6,773,322 B2 | 8/2004 | Gabai et al. |
| 7,081,033 B1 * | 7/2006 | Mawle et al. ............. 446/175 |
| 7,384,325 B2 | 6/2008 | Kelly et al. |
| 7,520,793 B2 | 4/2009 | Pillai et al. |
| 8,497,659 B2 * | 7/2013 | Navid ..................... 320/108 |
| 2001/0027129 A1 | 10/2001 | Harina |
| 2007/0015588 A1 * | 1/2007 | Matsumoto et al. ........ 463/43 |
| 2009/0137185 A1 * | 5/2009 | Zheng ................ A63F 13/02 446/268 |
| 2011/0294579 A1 * | 12/2011 | Marks et al. ................ 463/36 |
| 2012/0231881 A1 * | 9/2012 | Matsunaga .................. 463/31 |
| 2013/0099696 A1 * | 4/2013 | Maxik .................. H01F 38/14 315/291 |

(Continued)

OTHER PUBLICATIONS

International Search Report on related PCT Application No. PCT/US2013/023273 from International Searching Authority (KIPO) dated May 14, 2013.

(Continued)

*Primary Examiner* — Milap Shah
*Assistant Examiner* — Jason Pinheiro
(74) *Attorney, Agent, or Firm* — Klein, O'Neill & Singh, LLP (57) ABSTRACT

A video game includes a component that senses the presence and identity of proximate toys. Each of the toys includes an identification device such as an RFID tag. Each of the toys is also associated with a corresponding game character or object. The toys further comprise audio, visual and other effects, wherein said effects are activated when the toy is proximate the gaming platform or a peripheral to the gaming platform. Effects may also be activated based on characteristics of the game character or aspects of the game play sequence thereby enhancing the user's gameplay experience.

4 Claims, 12 Drawing Sheets

(56) References Cited

U.S. PATENT DOCUMENTS

2013/0099757 A1* 4/2013 Ham .............................. 320/150

OTHER PUBLICATIONS

Written Opinion on related PCT Application No. PCT/US2013/023273 from International Searching Authority (KIPO) dated May 14, 2013.

* cited by examiner

INTERACTIVE VIDEO GAME WITH TOYS HAVING SPECIAL EFFECTS

BACKGROUND OF THE INVENTION

The present invention relates generally to video games and more particularly, to a video game and a toy used in connection with the video game having visual and audio effects.

Video games provide fun and enjoyment for many. Video games allow game players to participate in a variety of simulated activities. Video games allow game players to perform roles and experience activities that the game players may not be able or desire to experience directly, whether due to cost, danger, or equipment concerns, or simply due to a role or activity being a fantasy.

Video games, being generally provided by way of an electronic device and associated display, often lack a physical component by which a player may touch and hold a representative object associated with video game play or otherwise have a physical object representative of video game play. Despite the sometimes intense graphics action of various video games, the game play experience remains two dimensional. Merely interacting with a displayed simulated environment may not allow game players to fully relate to game play, with a sharply distinct separation between a game play world and the world physically inhabited by the game players.

BRIEF SUMMARY OF THE INVENTION

One aspect of the invention provides a video game system comprising a console, a peripheral for a gaming platform, such as a game console, computer, mobile device or server, and a toy comprising an electronic payload, wherein the peripheral provides power to the toy for the electronic payload. In various embodiments the electronic payload may include, without limitation, a light source, sound effect device, motor, actuator, heat source or other device to create a visual, audio, motion, physical, thermodynamic or other effect on the toy. For example, the effects may be triggered by the toy's proximity to the peripheral, by character data relating to the toy, or by game play events.

Another aspect of the invention provides a video game system comprising a console, a peripheral for a gaming platform and a toy comprising an electronic payload, wherein the peripheral provides an inductive field for powering the electronic payload in the toy.

Another aspect of the invention provides a video game system comprising a console, a peripheral for a gaming platform, and a toy configured with a light source and at least one translucent surface, the peripheral including a radio frequency identification interface, the toy including circuitry to receive inductive power from the radio frequency identification interface to power the light source to emit through the translucent surface to create a visual effect when proximate the peripheral.

Another aspect of the invention provides a video game system comprising a console, in communication with an electronic payload in a toy, the console including a processor for executing instructions to conduct a game play pattern and for controlling the electronic payload in a toy to cause a visual, audio, or other physical effect by the electronic payload in the toy.

Another aspect of the invention provides an interactive video game system comprising a peripheral device, a toy configured with a light source and at least one translucent surface, a console, in communication with the toy and peripheral device, the console including a processor for executing instructions to conduct a game play pattern and for controlling the light source of the toy to emit light to cause a visual effect when the at least one translucent surface of the peripheral is exposed to the light of the peripheral or display device.

Another aspect of the invention provides a computer implemented method for use in providing a video game, comprising conducting a game play sequence, and controlling an electronic payload to create visual, audio, or other physical effects emit a light based on the game play sequence.

These and other aspects of the invention are more fully comprehended upon review of this disclosure.

DETAILED DESCRIPTION

Figure 1A:
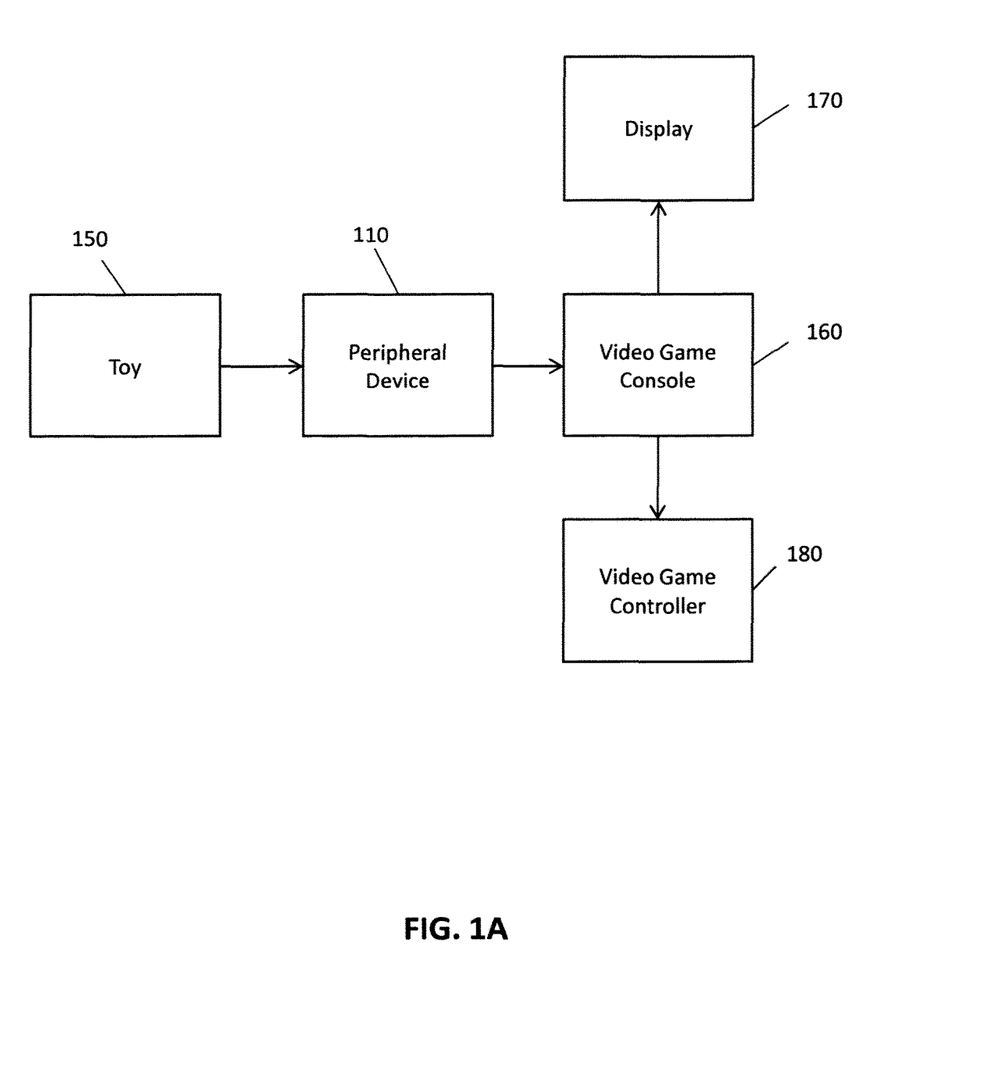
FIG. 1A is a block diagram illustrating an example of a video game system in accordance with aspects of the present invention.

FIG. 1A is a block diagram illustrating an example of a video game system in accordance with aspects of the present invention. Referring to FIG. 1 the video game system includes a video game console 160 with a processor for executing program instructions providing for game play and associated circuitry, a video game controller 180, a display device 170, a peripheral device 110 and a toy 150. Although a video game console 160 is depicted, it is understood that in other embodiments the video game may be operated on a personal computer, mobile device or on a remote server or any other gaming platform alone or in combination with other devices in a system, which may obviate the requirement for the peripheral device 150, with functions of the peripheral device being performed, in some embodiments, by such platforms or other devices. The toy includes an electronic payload (not shown in FIG. 1A), such as light emitting diodes which serve as a light source which may be used to produce visual effects in connection with a video game. Other electronic components may comprise the payload, for example as is described in more detail throughout the specification.

Figure 1B:
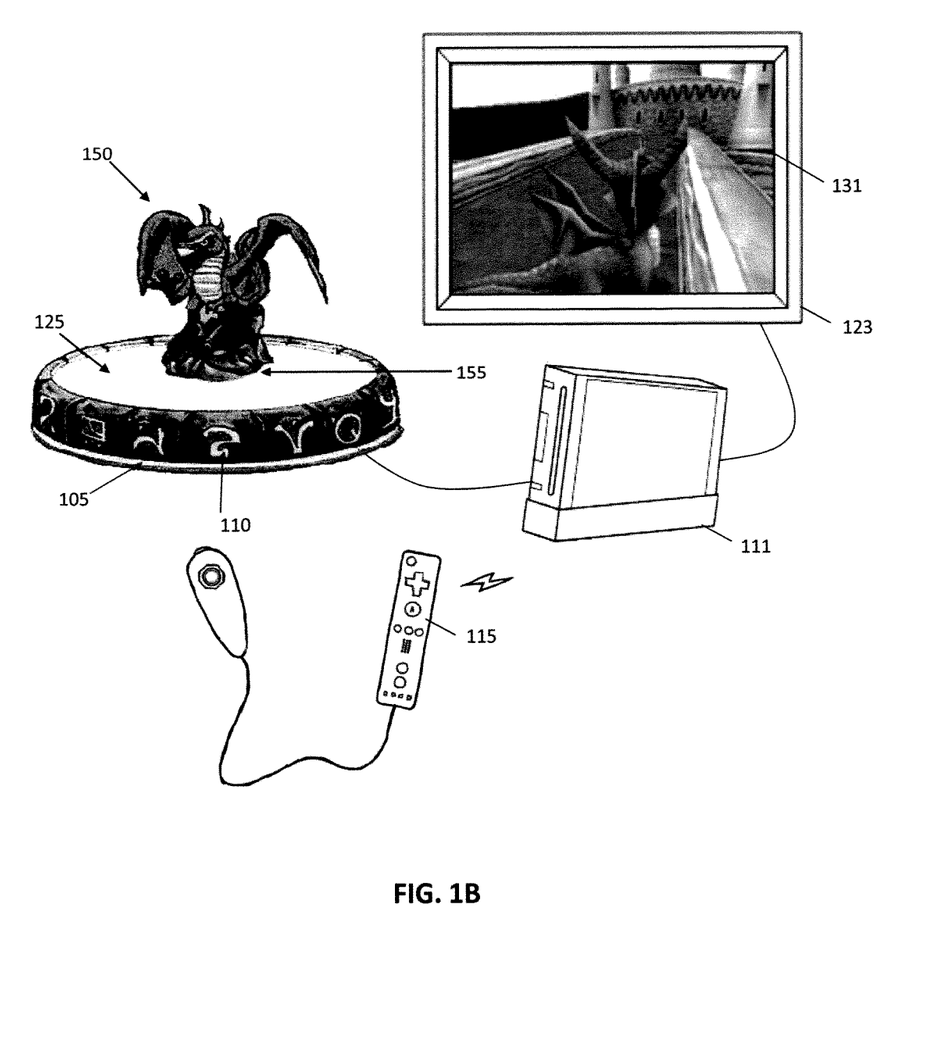
FIG. 1B illustrates an example of a video game system in accordance with aspects of the invention.

FIG. 1B illustrates an example of a video game system in accordance with aspects of the invention. The video game system includes a game console 111 with a processor for executing program instructions providing for game play and associated circuitry, user input devices such as a game controller 115, a display device 123 for displaying game action, a peripheral device 105, and a toy 150, which in various embodiments includes the capability to provide audio, visual or other physical effects. The peripheral device 105 may also provide the toy 150 with electrical power to provide such effects.

The peripheral device 105 may also provide the capability to read and write information to the toy 150. The processor, responsive to inputs from the user input devices and the peripheral device, generally commands display on the display device of game characters in and interacting with a virtual world of game play and possibly each other. In addition, the processor, responsive to inputs from the peripheral device, may be used to add characters and objects to the virtual world, with the characters able to manipulate the added objects and move about the virtual world. For example, the processor may include characters in game play based on inputs from the peripheral device, and the processor may control actions and activities of game characters based on inputs from the user input devices.

The toy 150 may produce various effects, such as emitting light, generating sounds, producing movement by the toy, generating heat or other physical effects in response to proximity of the toy to peripheral 105.

Further, the processor may initiate, command or control the toy 150 to produce various effects, such as emitting light, generating sounds, producing movement by the toy, generating heat or other physical effects in accordance with the game play, characteristics of a video game character, video game achievements or the entry or exit into or out of game play of a character associated with the toy.

The instructions providing for game play are generally stored on removable media, for example, an optical disk. Accordingly, the game console may include an optical drive, for example, a DVD-ROM drive, for reading the instructions for game play. In some embodiments, the game console may be a personal computer, including similar internal circuitry as herein described, as well as, for example, a built-in display and built-in user input devices, such as a keyboard and a touch pad. In other embodiments, the instructions providing for game play may be stored in a remote server that are accessed by a computer or mobile device. In yet other embodiments, the instructions providing for game play may be stored locally on the gaming device memory.

The display device is generally coupled to the gaming platform by a cable, although in some embodiments a wireless connection may be used. In many embodiments, the display device is a liquid crystal display. In some embodiments, the display device is a television. In some embodiments, the display device is a cathode ray display, a plasma display, an electroluminescent display, an LED or OLED display, or other display. A display screen 131 of the display device displays video images of game play, generally as commanded by the processor or other associated circuitry of the gaming platform. In the embodiment of FIG. 1B, the display screen shows a screen shot of video game play. As illustrated, the screen shot shows a display of a character, generally controlled by and animated in accordance with user inputs, approaching an inanimate item in the form of what may be considered a castle.

The peripheral device, in some embodiments and as shown in FIG. 1B has a substantially flat upper surface for placement of toys thereon. The game player generally places game toys, for example, object 150 in the form and representative of a dragon as shown in FIG. 1B, on the flat surface of the peripheral device during game play. The toy object is generally in the form of and representative of a game item such as a game character or other game item. In several embodiments, the toy is associated with a game character during game play.

Figure 2:
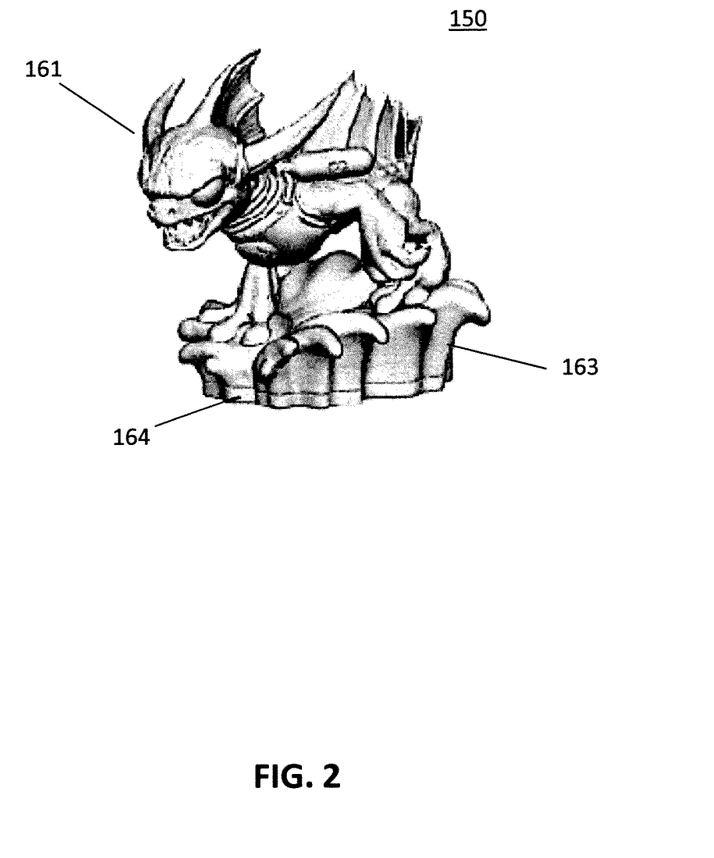
FIG. 2 is a model of a toy object in accordance with embodiments of the invention.

FIG. 2 is a model of a toy in accordance with embodiments of the invention. As shown in FIG. 1, the toy includes a base 163 and a toy FIG. 161. Of course, in various embodiments the toy could be configured without the base structure.

As shown in FIG. 2, the toy includes various surfaces. In certain embodiments implementing a lighting effect, the surfaces of the toy may be comprised of a fluorescing or translucent material to allow for lighting effects when provided with light from a light source. For example, the eyes of the toy object may be made of a fluorescing or translucent material, to allow for light to emit from an eye of the toy figure in response to proximity with the peripheral or based on game play using the toy. The light source may be, in various embodiments, a light bulb, a light emitting diode (LED) or other solid state light source, fiber-optics receiving light from a light source, an electroluminescent wire or sheet, a phosphor doped or covered material, an incandescent light source, a fluorescent light source, a laser, or other light source, for example. In some embodiments, the light source is a red, green and/or blue LEDs. The light source in some embodiments is within the toy figure, in some embodiments within the base, and in some embodiments on or extending from a surface of the toy.

Further, the toy may also include fluorescing or translucent material on the sides of the device and the fluorescing or translucent material may be overlaid with a shaped non-translucent material in order to produce lighted shapes, letters or other symbols when exposed to the light from the light source. The fluorescing or translucent material may also be provided with a color tint such as green, orange, red, pink, for example, to thereby enable further visual effects when the fluorescing or translucent material is exposed to light.

Each toy may include machine-readable information, for example, memory, a radio frequency identification (RFID) tag or a barcode. The machine-readable information may be sensed, read, and/or in some embodiments written, by the peripheral device, in some embodiments indirectly by way of sending data and commands to the toy to write the data to memory of the toy. The machine-readable information may include a numeric identifier. The machine-readable information allows the peripheral device, or the processor of the gaming platform, to distinguish one toy from other toys, and the machine-readable information may therefore be considered to include a toy identifier, and in some embodiments, each particular toy has its own distinct identifier. In addition, in many embodiments the machine readable information includes additional information about a corresponding game character, including in some embodiments, status of the game character in a game.

When a toy is read by the peripheral device, the peripheral device provides the gaming platform an indication of the identifier and status information of the toy, and generally the processor of the gaming platform commands display of a corresponding game character or otherwise makes the corresponding game character available in game play. Likewise, when a toy in the form of an article such as a hat or weapon is placed on the peripheral device, the processor may make a corresponding article appear in the game and the article may affect changes or the ability to make changes in the game. For example, when a hat toy and a character toy are concurrently on the peripheral device, the corresponding character in the game may possess the corresponding hat. Thus, video game play may be affected by use of real world objects, objects which may also be utilized for play and/or observation separate from video game play.

The toy may further include a processor or control circuitry that is in communication with the console, for example via the peripheral. The processor of the gaming platform may further command the toy to produce effects. For example in one embodiment, the processor may command the toy, via the peripheral or directly in various embodiments, to produce light according to game play. For example, when a character associated with the toy is in a low health state, the processor may command the toy to produce a red light to alert the player of the health status. As a further example, when the character's health reaches a predetermined critically low state, the processor may command the toy to produce a flashing red light, for example, by commanding the toy processor or control circuitry to toggle the light on and off.

Figure 3:
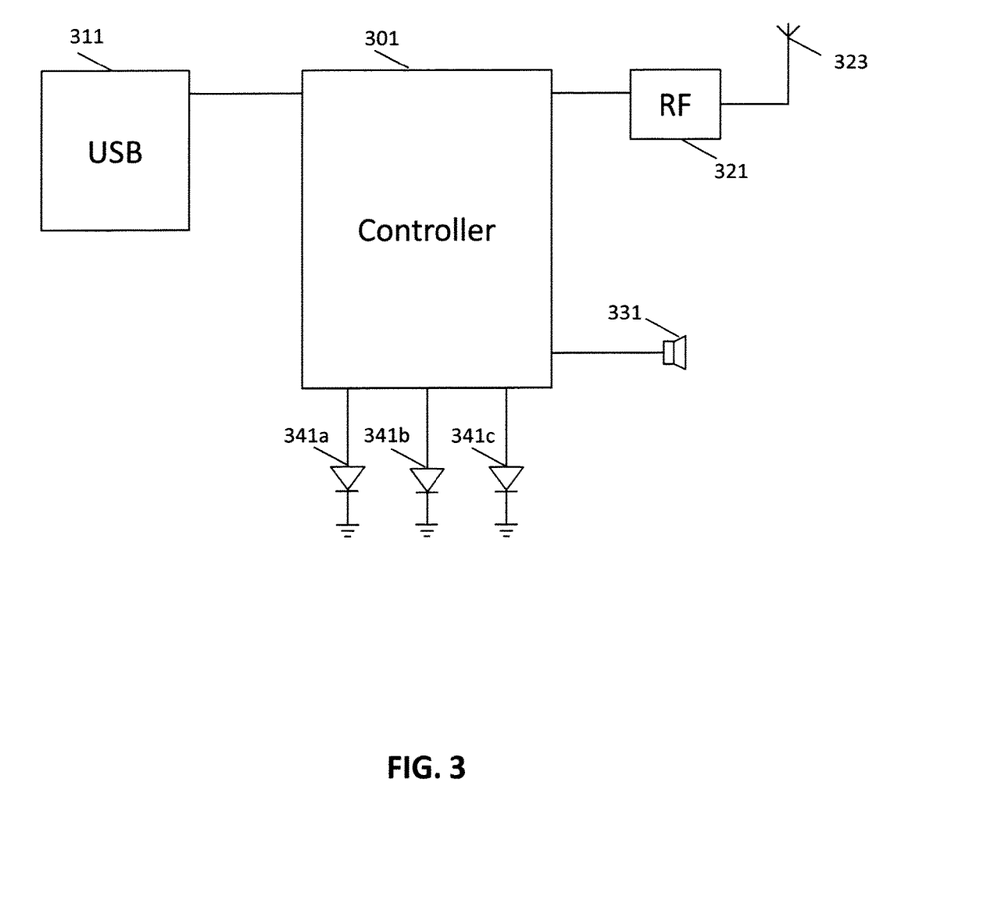
FIG. 3 is a block diagram of a video game peripheral in accordance with aspects of the invention.

FIG. 3 is a block diagram of a video game peripheral in accordance with aspects of the invention. The peripheral may be used in some embodiments as the peripheral device of FIG. 1. The peripheral may be used to provide information from the toy to a gaming platform and, in some embodiments, from the gaming platform to the toy. Accordingly, the peripheral includes a universal serial bus (USB) interface 311 to communicate with the gaming platform. In some embodiments, the peripheral may use a different interface, for example, a wireless interface for communication with the gaming platform. The information communicated between the peripheral and the gaming platform may be encrypted, and the information read from or written to the toy by the peripheral may also be encrypted.

The peripheral also includes a radio-frequency interface 321 to communicate with toys. In many embodiments, the radio-frequency interface is an RFID interface. In other embodiments, the peripheral may include a different interface for communicating with toys, such as an optical interface or a wired interface. It is further understood that in some embodiments, the peripheral device (as depicted in FIG. 3) may be removed. For example, in certain embodiments of the present invention, the functionality of the peripheral device may already be included, in whole, or part, within the gaming platform, such as for example, if the gaming platform is a near field communication (NFC) or RFID equipped mobile device.

In one embodiment of an optical interface the toy includes a light source, for example an LED, to provide information of the machine readable information and a photodiode to receive information of commands, with circuitry operable within the toy to provide for associated operation of the LED and photodiode in performing communication functions. Power may be provided to the toy by way of a battery, by way of RFID operations, or by other sources. In such an embodiment the peripheral device similarly includes a photodiode and LED for communication with the toy.

In another embodiment the peripheral device includes an imaging device, for example a CCD and associated circuitry. In such embodiments the imaging device may generate an image, for analysis by the peripheral device or in most embodiments by the gaming platform, with the image providing information related to the toy. In some embodiments identity of the toy may be determined by shape or other features, such as color or reflectivity, of the toy or portions of the toy. Similarly, identity and other information of the toy may be provided by image information placed on the toy, including, for example, information of stickers placed on the bottom of the toy, placed either prior to receipt of the toy by a user or by the user, in which case the information may be changed by the user in accordance with game play results. The toy may instead, or in addition may include bar code or bar code like information, with the peripheral device including bar code scanning components.

Further in some embodiments the toy may include a wired connection to the peripheral device, or in some embodiments, a wired connection to the gaming platform, possibly dispensing with the peripheral device. Similarly, in some embodiments the toy may include wireless communication capabilities of the type commonly used with computers, for example Bluetooth, near field communication (NFC) or Wi-Fi capabilities.

The peripheral includes a controller 301 that is coupled to the USB interface and the radio-frequency interface. The controller adapts the signals between protocols used by the two interfaces. In some embodiments, the controller communicates with the radio-frequency interface based on commands received over the USB interface. For example, the controller may receive commands to determine what toys are present on the peripheral or to read from or write to a particular toy. In other embodiments, the controller may independently communicate with the radio-frequency interface and supply resulting information to a gaming platform over the USB interface. For example, the controller may, via the radio-frequency interface, regularly detect what toys are newly present on the peripheral and report the detected toys to the gaming platform via the USB interface. The controller generally includes a programmable device such as a microprocessor performing program instructions. The program instructions may be stored in the peripheral as firmware or downloaded from the gaming platform.

The peripheral also includes, in some embodiments, a loudspeaker 331. The loudspeaker provides audio signaling to game players and the signaling may relate to a particular toy present on the peripheral. In some embodiments, the peripheral includes visual indicators such as light-emitting diodes 341a-c. The diodes may, for example, be illuminated with intensities or colors that signal performance in the video game of characters associated with toys on the peripheral. Both the loudspeaker and visual indicators are coupled to the controller. The controller signals the loudspeaker and visual indicators to operate according to commands received via the USB interface.

Figure 4:
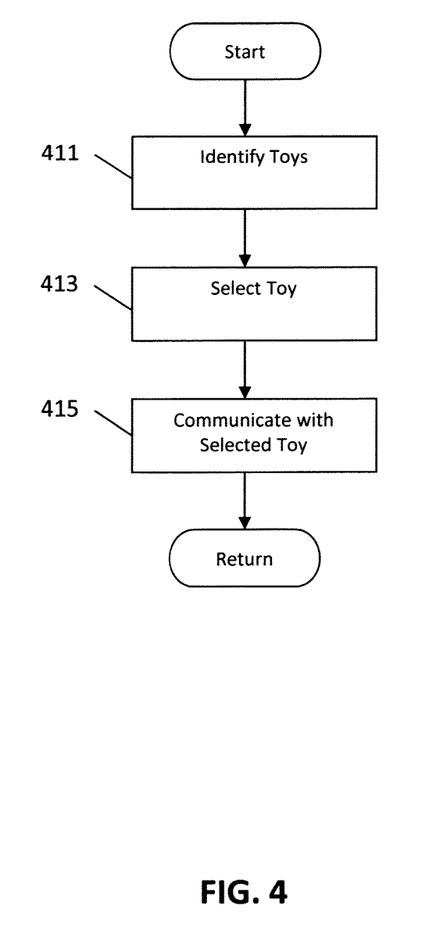
FIG. 4 is a flowchart of a process for communication with toys in accordance with aspects of the invention.

FIG. 4 is a flowchart of a process for communication with toys in accordance with aspects of the invention. The process may be implemented by a video game peripheral, a video gaming platform, or a combination of devices. Additionally, the process may be implemented using a processor configured by program instructions. The process may be performed utilizing a standardized protocol, for example, the ISO/IEC 14443 standard for Identification Cards. Accordingly, the process may communicate with toys via radio-frequency communication.

In block 411, the process identifies toys in a defined region. For example, the process may determine what toys are on the surface of a video game peripheral as shown in FIG. 3. In various embodiments, the toys may be identified by RFID, barcodes, or optical recognition. In one embodiment, identification of toys includes a video game peripheral reading identifiers of the toys and supplying the identifiers to a video gaming platform.

In block 413, the process selects a toy for communication. The process may select the toy by transmitting a selection command having an identifier matching the identifier of the toy. In many embodiments, the process expects to receive an acknowledgment of the selection from the toy. When an acknowledgment is not received, the process may retransmit the selection command or may signal a video game associated with the process that the selected toy is not available.

In block 415, the process communicates with the selected toy. For example, the process may read from a particular memory location of the toy or may write to a particular memory location of the toy. In many embodiments, the process expects to receive an acknowledgment or response from the toy, and when not received, the process may retransmit the command or may signal the video game associated with the process that the selected toy is not available. The process thereafter returns.

Figure 5:
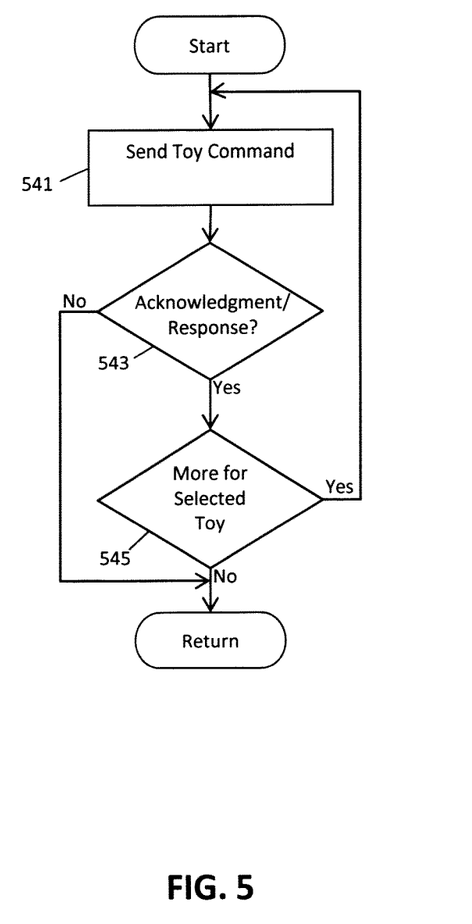
FIG. 5 is a flowchart of a process for communicating commands with a toy in accordance with aspects of the invention.

FIG. 5 is a flowchart of a process for communicating commands with a toy in accordance with aspects of the invention. The process may be as part of a process for communication with toys such as the process of FIG. 4. Accordingly, the process may be performed by a video gaming platform, a video game peripheral, or a combination of devices, and the process may use a processor configured by program instructions.

In block 541, the process sends a command to the toy. For example, the process may send a read command to acquire data from the toy or a write command to supply data to the toy. Accordingly, the command may include an address value indicating a memory location in the toy to be accessed.

In block 543, the process determines whether it received an acknowledgment from the toy in response to the command sent in block 541. The process may, for example, determine that it received an acknowledgment when it receives a message containing a positive acknowledgment (ACK) from the toy. For a read command, the acknowledgment may include the data read. When the process determines that it has received an acknowledgment, the process continues to block 545; otherwise, the process returns. In other embodiments, the process may return to block 541 to retry sending the command when an acknowledgment has not been received. When the process does not receive an acknowledgment, the process may additionally inform a video game associated with the process that the toy being command to communicate is not present.

In block 545, the process determines whether it has any more commands to send to the toy. The process may determine that it has more commands for the toy, for example, by checking a list of actions in the video game associated with the process. When the process determines that there are more commands for the toy, the process returns to block 541; otherwise, the process returns.

Figure 6:
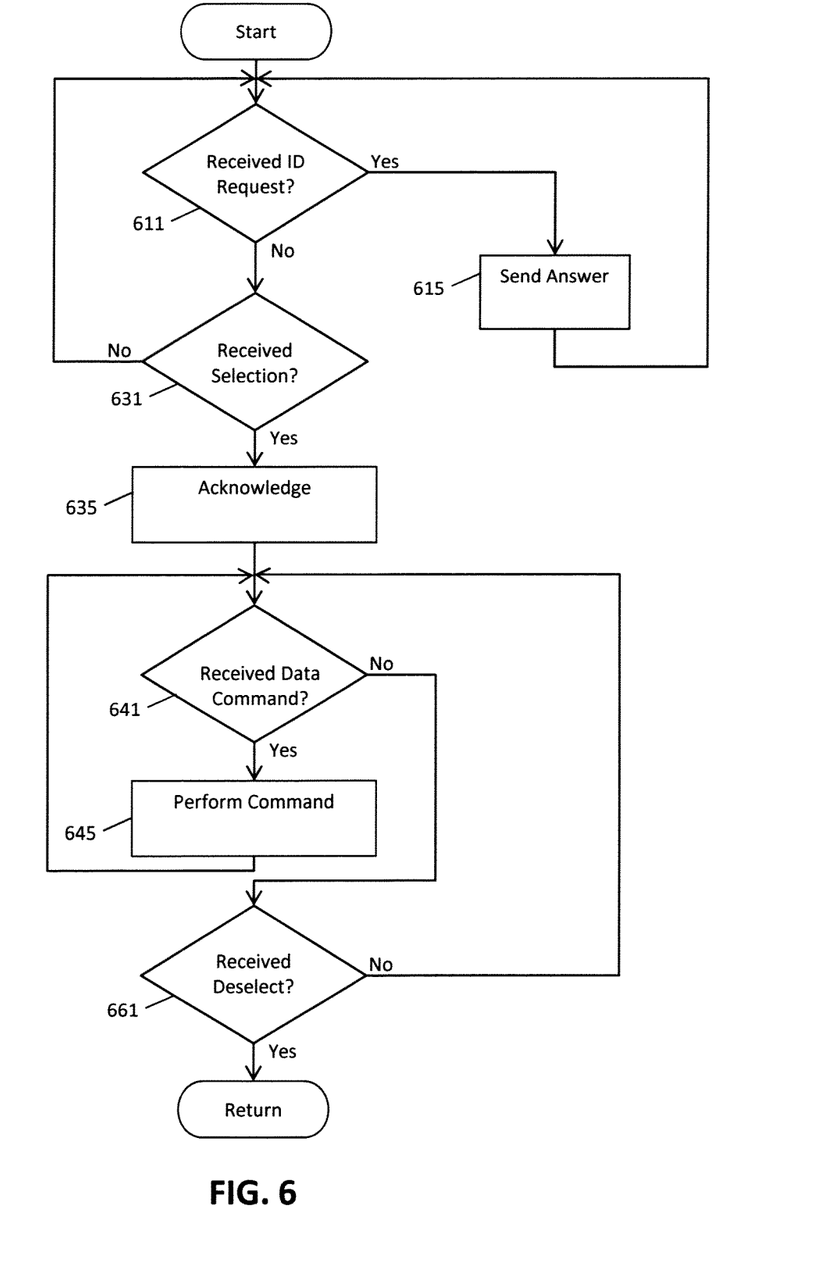
FIG. 6 is a flowchart of a process for communication with a video game peripheral in accordance with aspects of the invention.

FIG. 6 is a flowchart of a process for communication with a video game peripheral in accordance with aspects of the invention. The process may be implemented by a toy used in a video game, for example, one of the toys of FIG. 1. The process may be performed utilizing a standardized protocol, for example, the ISO/IEC 14443 standard for Identification Cards. Accordingly, the process may communicate with a video game peripheral via radio-frequency communication. Furthermore, the process may communicate with a video game peripheral that performs any of the process illustrated in FIGS. 4-5.

In block 611, the process determines whether it has received a request for an identifier associated with the toy. For example, in an embodiment of the process that uses the ISO/IEC 14443 protocol, the process may determine whether it has received a request command (REQA) or a wake-up command (WUP). A request for an identifier may include a range of identifiers that are requested to respond, and the process determines that it has received a request for its identifier when its identifier is within the requested range of identifiers. When the process determines that it has received a request for its identifier, the process continues to block 615; otherwise, the process continues to block 631.

In block 615, the process sends an answer to the request for its identifier. The answer generally includes the identifier or a portion of the identifier. For example, the request for the identifier may have included a portion of the identifier with the process including the remaining portion of the identifier in the answer. Thereafter, the process returns to block 611.

In block 631, the process determines whether it has been selected for further data communication. The process may, for example, determine that it has been selected when a select command (SEL) is received that includes the identifier of the toy. When the process determines that it has been selected, the process continues to block 635; otherwise, the process returns to block 611.

In block 635, the process acknowledges the selection determined in block 631. The process may, for example, transmit a selection acknowledge (SAK) message.

In block 641, the process determines whether it has received a data command. The process may, for example, determine that it has received a command instructing it to read data from or write data to a memory. When the process determines that it has received a data command, the process continues to block 645; otherwise, the process continues to block 661.

In block 645, the process performs the command of block 641. For example, the process may perform a read command by reading values from the memory and transmitting the values. In another example, the process may perform a write command by writing values supplied with command to the memory and transmitting an acknowledgment of the command. Thereafter, the process returns to block 641.

In block 661, the process determines whether it has been deselected from further data communication. The process may, for example, determine that it has been deselected when it receives a deselect command (DESEL) or a halt command (HLTA). When the process determines that it has been deselected, the process returns; otherwise, the process returns to block 641. In some embodiments, the process may wait in a halted state until it receives a wake-up command (WUP) before it returns. When the process is in the halted state, it does not respond to identification request commands, selection commands, or data commands.

Figure 7:
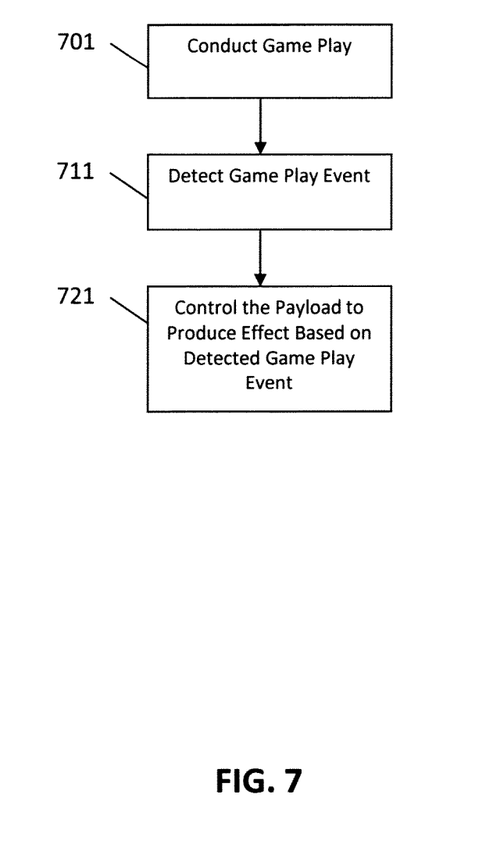
FIG. 7 is a flowchart of a process for providing effects in connection with a video game in accordance with aspects of the invention.

FIG. 7 is a flowchart of a process for providing visual lighting effects in connection with a video game in accordance with aspects of the invention. In block 701, the process conducts game play. In some embodiments the process may conduct game play by way of a processor of a video game platform executing instructions to conduct a game play sequence based in part on inputs by a player. In block 711, the process detects a game play event. For example, in some embodiments a video game platform may include a data structure including a plurality of predetermined events and a lighting effect that is to be produced in response to the occurrence of said game play event, with the processor of the video game platform determining if any of the predetermined events has occurred. Game play events may include any occurrences or achievements within the game, for example, obtaining of treasure or other desirable items within the game, solving puzzles, being hit by an enemy, changes to health or supplies, level advancement, high score achievements, defeating of an enemy character, entry to a new location or location type within the virtual, or any other actions, change of conditions, or developments within the game. In one example, a white light is to be produced if a character levels up, but a red light is to be produced if the character is defeated by the enemy. In another example, a blue light is to be produced if the character enters a body of water.

In block 721, the process initiates, commands or controls the toy to produce an effect, for example a light or sound effect, based on the detected game play event. In some embodiments the process may initiate, command or control the toy by having the processor of the video game platform command illumination of an LED of the toy, with interface circuitry of the video gaming platform providing a signal indicative of the command to the toy. For example, the toy device may be commanded or controlled to illuminate RGB LEDs of the toy, for example in order to produce any one of a plurality of colors by activating or deactivating an LED or a combination of the LEDs.

Figure 8:
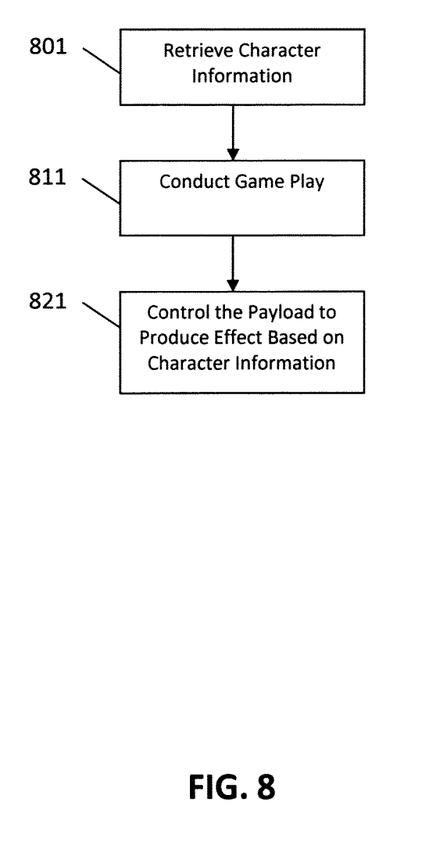
FIG. 8 is a flowchart of a process for providing effects in connection with a video game in accordance with aspects of the invention.

FIG. 8 is a flowchart of a process for providing visual lighting effects in connection with a video game in accordance with aspects of the invention. In block 801, the process retrieves information related to the character. In some embodiments the information may be retrieved by a video game system, or by part of a video game system. The character information may be retrieved from a video game disc, or from information stored in a memory of the physical toy as described above. The character information may include, for example, an elemental association, character level, number of victories, powers possessed by the character and other character attributes.

In block 811, the process executes instructions to conduct a game play sequence based at least on the character information retrieved. In some embodiments the operations of block 811 of the process are performed by a processor of the video game platform. In block 821, the process commands or controls a toy to produce an effect, such as light, based on the character information. For example, a toy associated with a character whose data indicates that it has obtained greater strengths may be commanded or controlled to emit a light effect corresponding to the level reached by that character. The process may initiate, command or control the toy, for example, as discussed with respect to block 721 of the process of FIG. 7.

Figure 9:
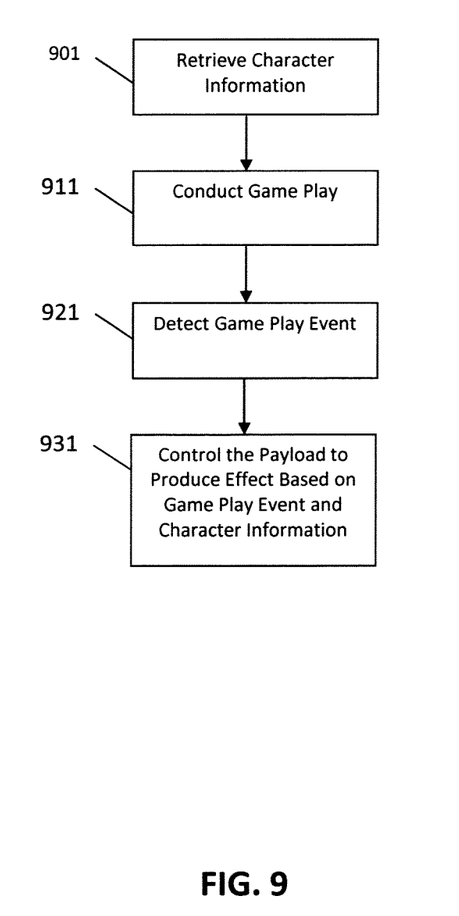
FIG. 9 is a flow chart of a process for providing visual lighting effects in connection with a video game in accordance with aspects of the invention.

FIG. 9 is a flowchart of a process for providing visual lighting effects in connection with a video game in accordance with aspects of the invention. In block 1501, the retrieves information related to the character. In some embodiments the information may be retrieved by a video game system, or by part of a video game system. The character information may be retrieved from a video game disc, or from information stored in a memory of a physical toy as described above. The character information may include, for example, an elemental association, character level, number of victories, powers possessed by the character and other character attributes.

In block 911, the process, for example by way of a processor of the video game system, executes instructions to conduct a game play sequence based at least on the character information retrieved. In block 921, the process detects a game play event. The process may detect a game play event, for example, as discussed with respect to block 711 of the process of FIG. 7. In block 931, the process commands or controls a toy to produce an effect, for example emitting light, based on the character information and/or the detected event.

Figure 10:
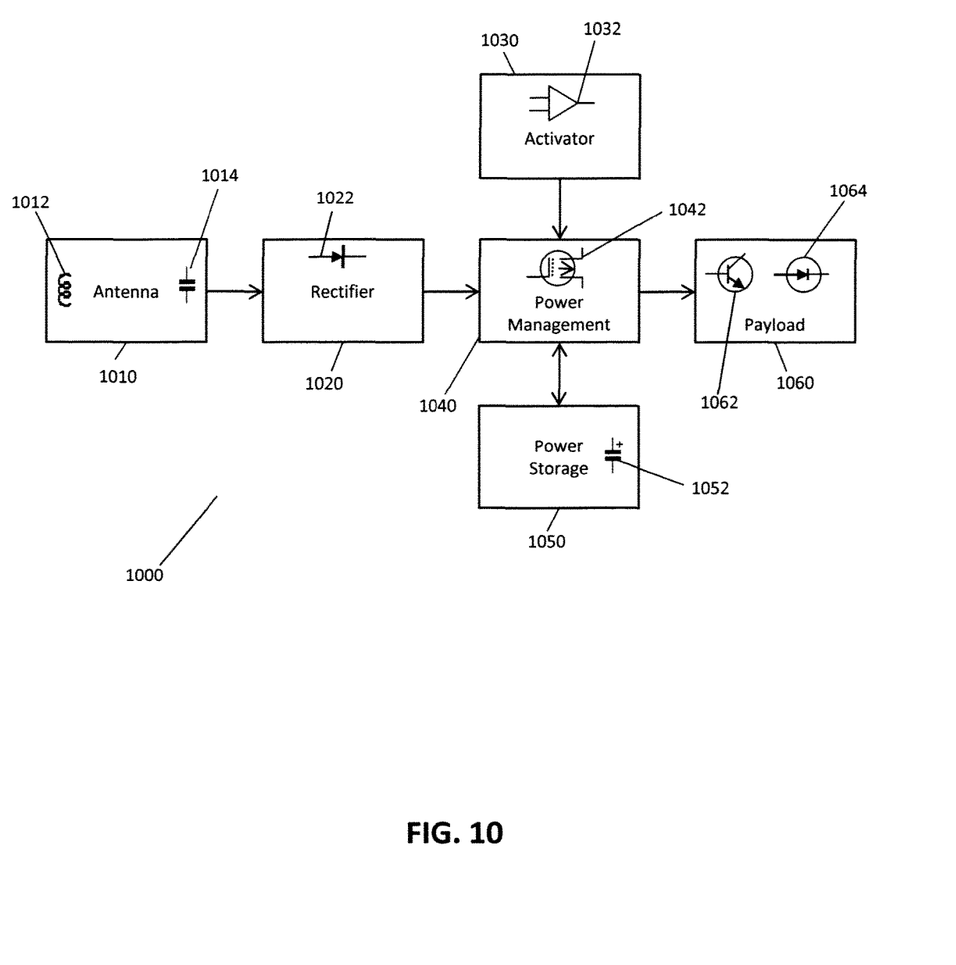
FIG. 10 is a block diagram for an electronic circuit for providing effects in connection with a video game in accordance with aspects of the invention.

FIG. 10 is a block diagram of an embodiment of circuitry 1000 within a toy to provide, in various embodiments, audio, visual, or other physical effects by the toy. Block 1010 provides a proximity detector, such as an ISO14443 tag. Embodiments of the proximity detector comprise a coil 1012, such as an inductor, that is coupled in parallel to a capacitor 1014 to form an LC circuit that is coupled to an integrated circuit (IC). In addition to providing for communication between the toy and the peripheral, as described above, the proximity detector 1010 in this embodiment is powered by resonant inductive coupling via the LC circuit. Typically, the peripheral produces an electromagnetic field that excites the coil 1012 and resonant current charges the capacitor 1014, which in turn energizes and powers the IC. In other embodiments, power may be provided to the toy by way of a battery, wired connections, or by other sources.

In the embodiment in FIG. 10, the proximity detector 1010 is coupled to a rectifier 1020 to convert the alternating current received by the proximity detector 1010 to direct current. In one embodiment, the rectifier may comprise a Schottky diode having a low forward voltage and low capacitance. In other embodiments, other known circuitry for converting AC to DC may be used. In still other embodiments, such a circuit may be unnecessary depending on the power source used for the toy.

The output from rectifier 1020 is coupled to power management circuit 1040, comprising for example a transistor 1042, an activator circuit 1030, comprising for example an op amp 1032 and/or logic circuitry, and a power storage circuit 1050, comprising for example a capacitor 1052. In this embodiment, the power storage circuit 1050 stores the energy and power received from the proximity detector 1010. The energy and power stored in the power storage circuit 1050 is used to provide energy and power to the payload 1060. The power management circuit 1040 together with the activator circuit 1030 regulate when power is transferred from the power storage circuit 1050 to the payload 1060. For example, power may be provided to the payload anytime the toy is proximate the peripheral. In other embodiments, the toy may be capable of storing power and generating effects after it is removed from proximity to the peripheral or gaming platform. In other embodiments, power may only be provided to the payload at selected times or intervals, for example, at predetermined intervals or in response to certain events within the video game. In still other embodiments, the activator circuit 1530 may include one or more microcontrollers, such as MicroChip PIC family, Atmel ATTINY family of microcontrollers.

The payload may comprise any number of electronic circuits or devices. In FIG. 10, an embodiment wherein the payload is comprised of a transistor 1062 coupled to a light emitting diode 1064 is depicted. Other electronic components that may comprise the payload 1060 include a light source, such as a light bulb, laser. LCD, fluorescent light source, or other device emitting light. The light emitted can be of any color and may also be flashing. Other components that may comprise the payload 1060 include motors to provide a vibration (such as those used in cellular phones), pulsing, or movement of various toy parts, a speaker or other sound effect device, or a heating device, or other effects alone or in combination with each other. The payload may be placed anywhere within or throughout the toy interior or exterior.

Figure 11:
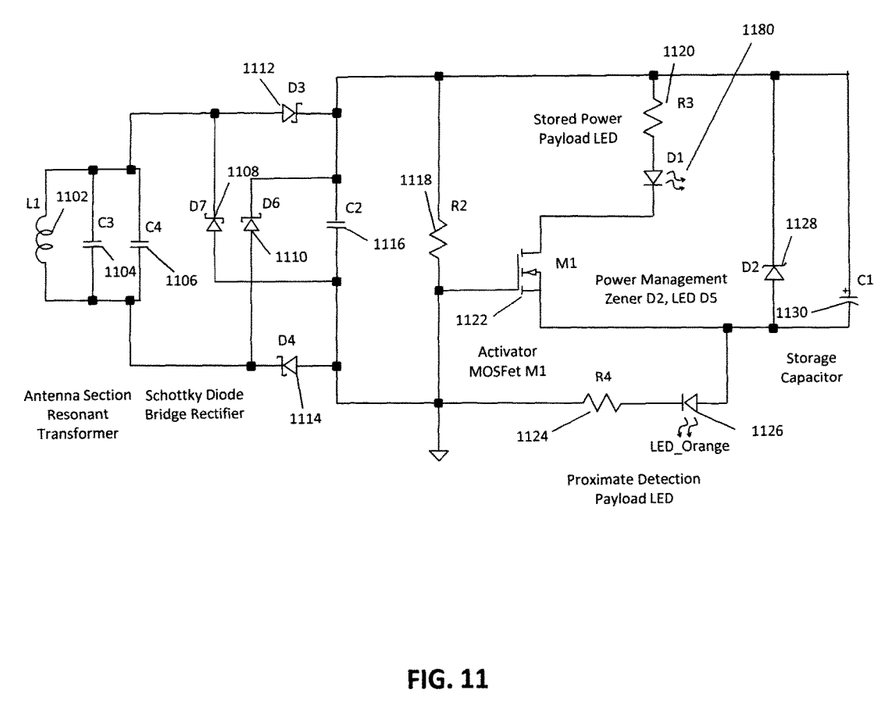
FIG. 11 is a diagram for an embodiment of an electronic circuit for providing lighting effects in connection with a video game in accordance with aspects of this invention.

FIG. 11 depicts an embodiment of a circuit within a toy providing lighting effects in connection with a video game in accordance with aspects of this invention. Inductor 1102 is connected in parallel with capacitors 1104 and 1106. In this embodiment, these components in combination correspond in part to the antenna 1110 depicted in FIG. 10, and function primarily to receive inductive energy from, for example, the peripheral to the gaming platform (or the gaming platform itself in other embodiments). Schottky diodes 1108, 1110, 1114, 1112 in combination with capacitor 1116 correspond in part with the rectifier 1020 and function primarily to convert the alternating current received from components 1102, 1104 and 1106 to direct current. MOSFET 1122 in combination with resistor 1118 corresponds in this embodiment with the activator 1030. In combination with Zener diode 1128, which corresponds in this embodiment with power management 1040, and capacitor 1130, which corresponds in this embodiment with power storage 1050, the flow of current is controlled to the payload, which in this embodiment comprises light emitting diodes 1180, 1126 and resistors 1124, 1120.

Although the invention has been discussed with respect to various embodiments, it should be recognized that the invention comprises the novel and non-obvious claims supported by this disclosure.

What is claimed is:

1. A physical object for use with a video game system, comprising:

a toy comprising a light source and memory storing information of a character in a video game, the toy having a form representative of the character;

said toy configured to communicate with a game platform operating said video game by way of a peripheral, including information of the character to the game platform by way of the peripheral;

said toy configured to receive inductive power from said peripheral when in proximity with said peripheral;

wherein said toy includes circuitry to illuminate said light source using said inductive power while said toy is receiving said inductive power from said peripheral; and wherein said information, of the character, stored in said toy's memory is modifiable by way of commands to the toy from said game platform by way of the peripheral based on operating of said video game;

wherein said toy is configured to receive inductive power from said peripheral using an inductor, and said circuitry to illuminate said light source comprises a rectifier to convert alternating current from said inductor to direct current and a capacitor to store power from said rectifier, and said light source is connected to said capacitor, and wherein said light source is connected in series with said capacitor.

2. The physical object of claim 1, wherein said circuitry to illuminate said light source is configured to illuminate said light source anytime the toy is proximate the peripheral.

3. The physical object of claim 1, wherein said light source is coupled between a first output node of the rectifier and a ground node.

4. The physical object of claim 1, wherein said capacitor is coupled between the light source and the first output node of the rectifier.

* * * * *